(12) United States Patent
Li et al.

(10) Patent No.: US 11,076,418 B2
(45) Date of Patent: Jul. 27, 2021

(54) PDSCH PROCESSING IN PRESENCE OF DOWNLINK PREEMPTION INDICATION

(71) Applicant: QUALCOMM Incorporated, San Diego, CA (US)

(72) Inventors: Chih Ping Li, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/357,476

(22) Filed: Mar. 19, 2019

(65) Prior Publication Data
US 2019/0320454 A1    Oct. 17, 2019

Related U.S. Application Data

(60) Provisional application No. 62/656,740, filed on Apr. 12, 2018.

(51) Int. Cl.
*H04W 72/12* (2009.01)
*H04L 1/18* (2006.01)
*H04W 72/04* (2009.01)

(52) U.S. Cl.
CPC ....... *H04W 72/1273* (2013.01); *H04L 1/1812* (2013.01); *H04W 72/0446* (2013.01)

(58) Field of Classification Search
CPC ... H04L 1/1812; H04L 1/1854; H04L 1/1896; H04W 72/0446; H04W 72/1273
See application file for complete search history.

(56) References Cited

U.S. PATENT DOCUMENTS

| 2016/0212625 | A1* | 7/2016 | Damnjanovic ....... H04W 16/14 |
| 2018/0070341 | A1  | 3/2018 | Islam et al. |

(Continued)

OTHER PUBLICATIONS

VIVO: "Remaining Issues on Multiplexing Data with Different Transmission Durations", 3GPP Draft, 3GPP TSG RAN WG1 Meeting 91, R1-1719798_Multiplexing Data with Different Transmission Durations_Final, 3rd Generation Partnership Project (3GPP), Mobile Competence Centre, 650, Route Des Lucioles, F-06921 Sophia-Ant, vol. RAN WG1, No. Reno, USA, Nov. 27, 2017-Dec. 1, 2017, Nov. 18, 2017 (Nov. 18, 2017), XP051369541, 11 Pages, Retrieved from the Internet: URL: http://www.3gpp.org/ftp/tsg%5Fran/WG1%5FRL1/TSGR1%5F91/Docs/ [retrieved on Nov. 18, 2017] p. 5-p. 6.*

(Continued)

*Primary Examiner* — Mehmood B. Khan
*Assistant Examiner* — Zhaohui Yang
(74) *Attorney, Agent, or Firm* — Patterson & Sheridan, L.L.P

(57) ABSTRACT

Certain aspects of the present disclosure provide techniques for physical downlink shared channel (PDSCH) processing in presence of downlink preemption indication (DLPI). A method for wireless communication by a base station (BS) includes determining a feedback timing indicator associated with a PDSCH transmission to a user equipment (UE) in a first slot. The determination is based on a first number of slots from the first slot until transmission of a DLPI to the UE in a second slot and a second number slots for a minimum processing time associated with the UE. The method includes sending downlink control information (DCI) to the UE scheduling the PDSCH transmission to the UE in the first slot. The DCI includes the feedback timing indicator. The UE determines how to process the PDSCH based on the feedback timing indicator.

20 Claims, 17 Drawing Sheets

(56) References Cited

U.S. PATENT DOCUMENTS

2020/0037350 A1* 1/2020 Park ................ H04L 1/1861
2020/0235866 A1* 7/2020 Liu ................. H04L 1/1861

OTHER PUBLICATIONS

International Search Report and Written Opinion—PCT/US2019/023220—ISA/EPO—dated Jun. 19, 2019.

NTT DOCOMO et al., "Pre-emption Indication for Downlink", 3GPP Draft, 3GPP TSG RAN WG1 Meeting #90, R1-1713960, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051316752, pp. 1-3, Retrieved from the Internet: URL: http://www.3gpp.org/ftp/Meetings_3GPP_SYNC/RAN1/Docs/ [retrieved on Aug. 20, 2017] p. 2-p. 3.

SONY: "Remaining Issues in Pre-emption Indicator", 3GPP Draft, 3GPP TSG RAN WG1 Meeting #91, R1-1720463—REL-15 NR—Remaining Issues in PI V03, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370015, 8 Pages, Retrieved from the Internet: URL: http://www.3gpp.org/ftp/tsg%5Fran/WG1%5FRL1/TSGR1%5F91/Docs/ [retrieved on Nov. 18, 2017] pp. 4. 6.

* cited by examiner

PDSCH PROCESSING IN PRESENCE OF DOWNLINK PREEMPTION INDICATION

CROSS-REFERENCE TO RELATED APPLICATION(S)

This application claims benefit of and priority to U.S. Provisional Patent Application Ser. No. 62/656,740, filed Apr. 12, 2018, herein incorporated by reference in its entirety as if fully set forth below and for all applicable purposes.

BACKGROUND

Field of the Disclosure

Aspects of the present disclosure relate to wireless communications, and more particularly, to techniques for physical downlink shared channel (PDSCH) processing in presence of downlink preemption indication (DLPI).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure relate to wireless communications, and more particularly, to techniques for physical downlink shared channel (PDSCH) processing in presence of downlink preemption indication (DLPI).

Certain aspects provide a method for wireless communication by a base station (BS). The method generally includes determining a feedback timing indicator associated with a PDSCH transmission to a user equipment (UE) in a first slot. The determination is based on a first number of slots from the first slot until transmission of a DLPI to the UE in a second slot and a second number slots for a minimum processing time associated with the UE. The method includes sending the timing feedback indicator to the UE in downlink control information (DCI) scheduling the PDSCH transmission.

Certain aspects provide a method for wireless communication by a UE. The method generally includes receiving DCI scheduling a PDSCH transmission in a first slot. The DCI includes a feedback timing indicator associated with the scheduled PDSCH transmission. The method includes receiving the PDSCH transmission in the first slot. The method includes determining how to process the PDSCH transmission based on the feedback timing indicator. The method includes processing the PDSCH transmission based on the determination.

Certain aspects provide an apparatus for wireless communication. The apparatus generally includes means for determining a feedback timing indicator associated with a PDSCH transmission to another apparatus in a first slot. The determination is based on a first number of slots from the first slot until transmission of a DLPI to the another apparatus in a second slot and a second number slots for a minimum processing time associated with the another apparatus. The apparatus includes means for sending the timing feedback indicator to the another apparatus in DCI scheduling the PDSCH transmission.

Certain aspects provide an apparatus for wireless communication. The apparatus generally includes means for receiving DCI scheduling a PDSCH transmission in a first slot. The DCI includes a feedback timing indicator associated with the scheduled PDSCH transmission. The apparatus includes means for receiving the PDSCH transmission in the first slot. The apparatus includes means for determining how to process the PDSCH transmission based on the feedback timing indicator. The apparatus includes means for processing the PDSCH transmission based on the determination.

Certain aspects provide an apparatus for wireless communication. The apparatus generally includes at least one processor configured to determine a feedback timing indicator associated with a PDSCH transmission to another apparatus in a first slot. The determination is based on a first number of slots from the first slot until transmission of a DLPI to the another apparatus in a second slot and a second number slots for a minimum processing time associated with the another apparatus. The at least one processor is configured to send the timing feedback indicator to the another apparatus in DCI scheduling the PDSCH transmission. The apparatus includes a memory coupled with the at least one processor.

Certain aspects provide an apparatus for wireless communication. The apparatus generally includes at least one processor configured to receive DCI scheduling a PDSCH transmission in a first slot. The DCI includes a feedback timing indicator associated with the scheduled PDSCH transmission. The at least one processor is further configured to receive the PDSCH transmission in the first slot. The at least one processor is configured to determine how to process the PDSCH transmission based on the feedback timing indicator. The at least one processor is configured to process the PDSCH transmission based on the determination. The apparatus includes a memory coupled with the at least one processor.

Certain aspects provide a computer readable medium having computer executable code stored thereon for wireless communication. The computer readable medium generally includes code for determining a feedback timing indicator associated with a PDSCH transmission to another apparatus in a first slot. The determination is based on a first number of slots from the first slot until transmission of a DLPI to the another apparatus in a second slot and a second number slots for a minimum processing time associated with the another apparatus. The computer readable medium includes code for sending the timing feedback indicator to the another apparatus in DCI scheduling the PDSCH transmission.

Certain aspects provide a computer readable medium for wireless communication. The computer readable medium generally includes code for receiving DCI scheduling a PDSCH transmission in a first slot. The DCI includes a feedback timing indicator associated with the scheduled PDSCH transmission. The computer readable medium includes code for receiving the PDSCH transmission in the first slot. The computer readable medium includes code for determining how to process the PDSCH transmission based on the feedback timing indicator. The computer readable medium includes code for processing the PDSCH transmission based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
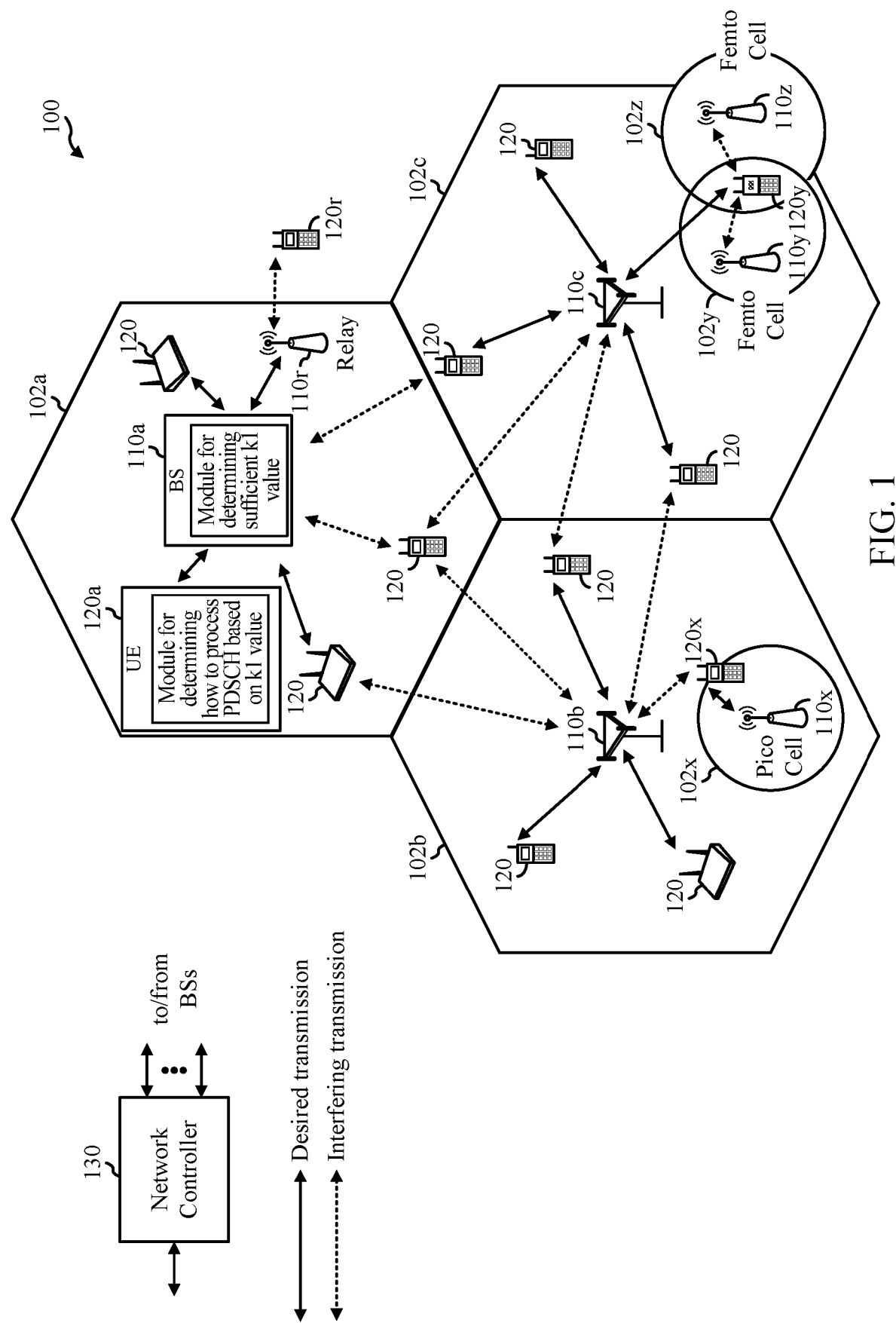
FIG. 1 is a block diagram conceptually illustrating an example telecommunications system, in accordance with certain aspects of the present disclosure.

Aspects of the present disclosure provide apparatus, methods, processing systems, and computer readable mediums for physical downlink shared channel (PDSCH) processing in presence of downlink preemption indication (DLPI).

In certain systems, such as NR (new radio or 5G) systems, a scheduled physical downlink shared channel (PDSCH) transmission may be preempted by another PDSCH transmission. For example, NR supports a variety of services including enhanced mobile broadband (eMBB) service and ultra-reliable low-latency communications (URLLC) service. An eMBB PDSCH transmission to a user equipment (UE) may be preempted by a URLLC PDSCH transmission to the UE or another UE. A base station (BS) provides a downlink preemption indicator (DLPI) to the UE, indicating the preempted resources, to improve decoding performance at the UE, for example.

When the BS schedules a PDSCH transmission, the BS sends a feedback timing indicator indicating when the UE should provide feedback, such as hybrid automatic repeat request (HARD) feedback, for the scheduled PDSCH transmission. If the UE waits, after receiving the scheduled PDSCH, to account for the DLPI in processing the received PDSCH, then the UE may have insufficient time to complete the processing before the indicated feedback timing. Therefore, techniques for PDSCH processing in the presence of the DLPI are desirable.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. The wireless communication network 100 may support enhanced mobile broadband (eMBB) and ultra-reliable low-latency communication (URLLC) services. A base station (BS), such as a BS 110a in the wireless communication network 100 may schedule physical downlink shared channel (PDSCH) transmission to a user equipment (UE), such as a UE 120a in the wireless communication network 100. The BS 110 may preempt the scheduled PDSCH with another PDSCH. For example, the BS 110a may schedule an eMBB PDSCH transmission to the UE 120a in a slot, then the BS 110a may transmit a URLLC PDSCH, to the UE 120a or to another UE 120 in one more symbols of the slot scheduled for the eMBB PDSCH, the URLCC PDSCH preempting the eMBB PDSCH. The BS 110a may send the UE 120a a downlink preemption indictor (DLPI) indicating the preempted resources. The BS 110a may ensure that the UE 120a can process the PDSCH taking into account the preempted resources. For example, the BS 110a determines a feedback timing indicator associated with the scheduled PDSCH. As shown in FIG. 1, the BS 110a has a module for determining a sufficient k1 value. The BS 110a may determine the feedback timing indicator based on the number of slots between the scheduled PDSCH and the DLPI and on the minimum processing time associated with the UE. The BS 110a includes the feedback timing indicator in the downlink control information (DCI) scheduling the PDSCH. The UE 120a can determine how to process the PDSCH based on the feedback timing indicator. For example, as shown in FIG. 1, the UE 120a has a module for determining how to process PDSCH based on a k1 value, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
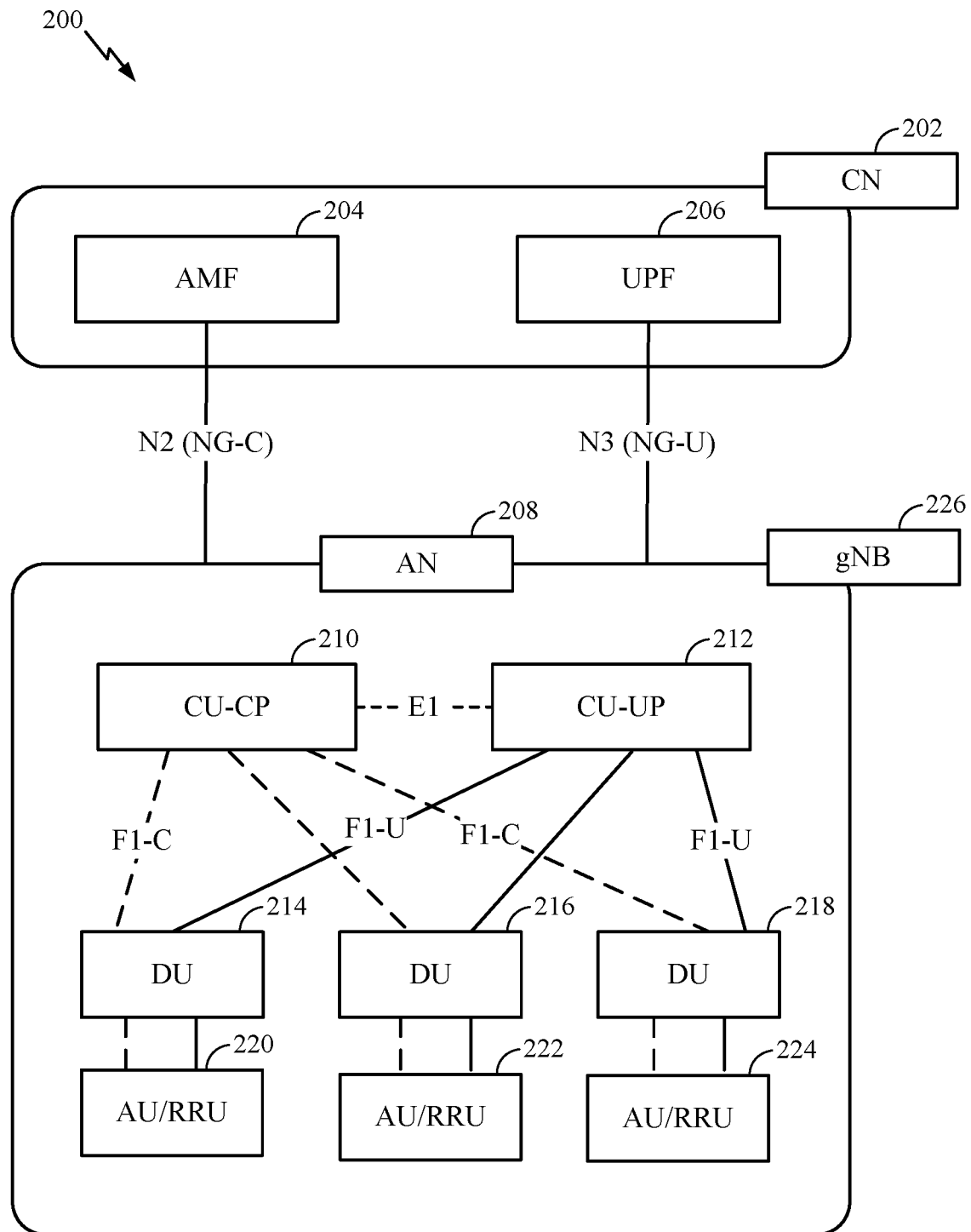
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1.2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
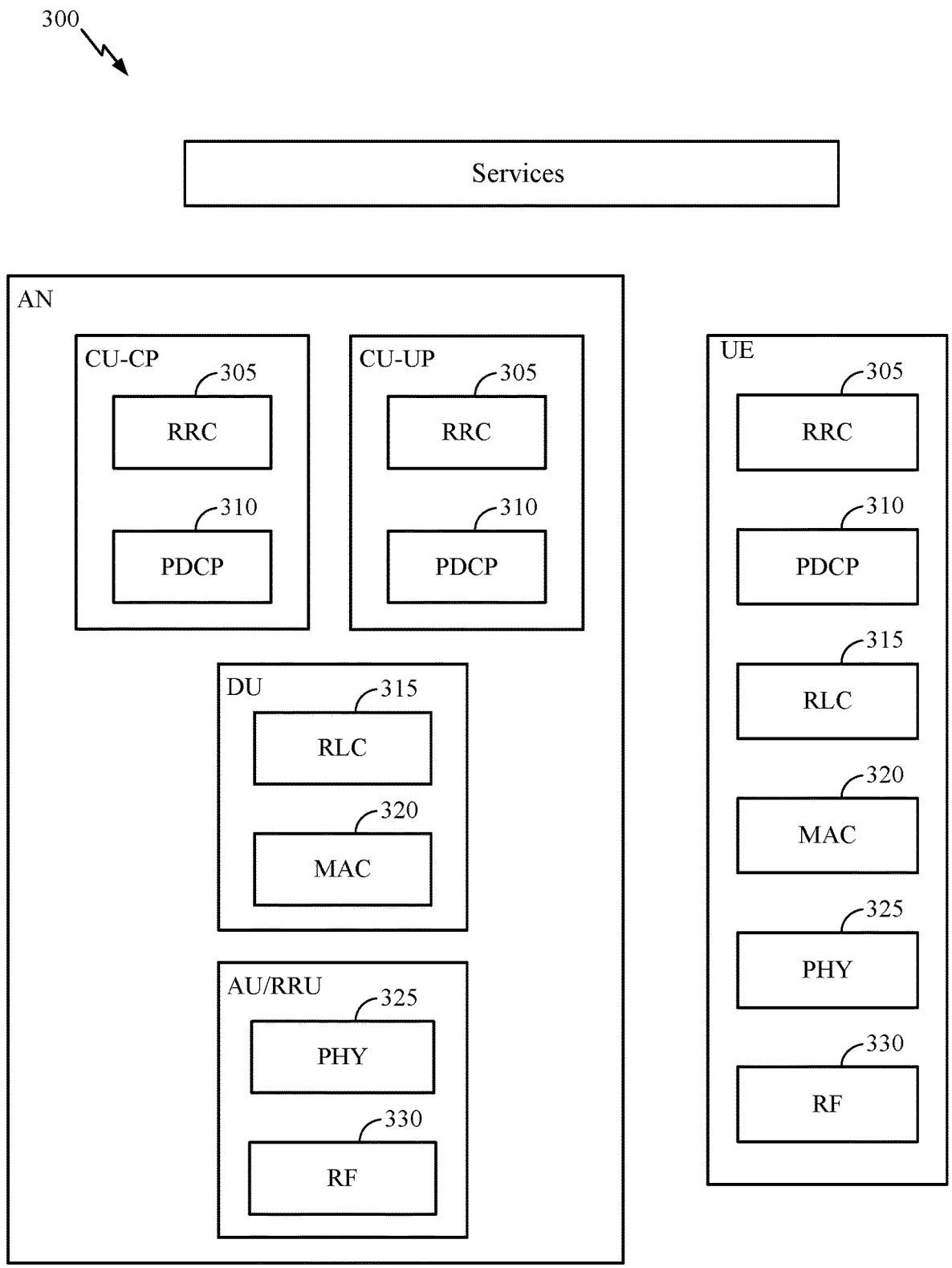
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
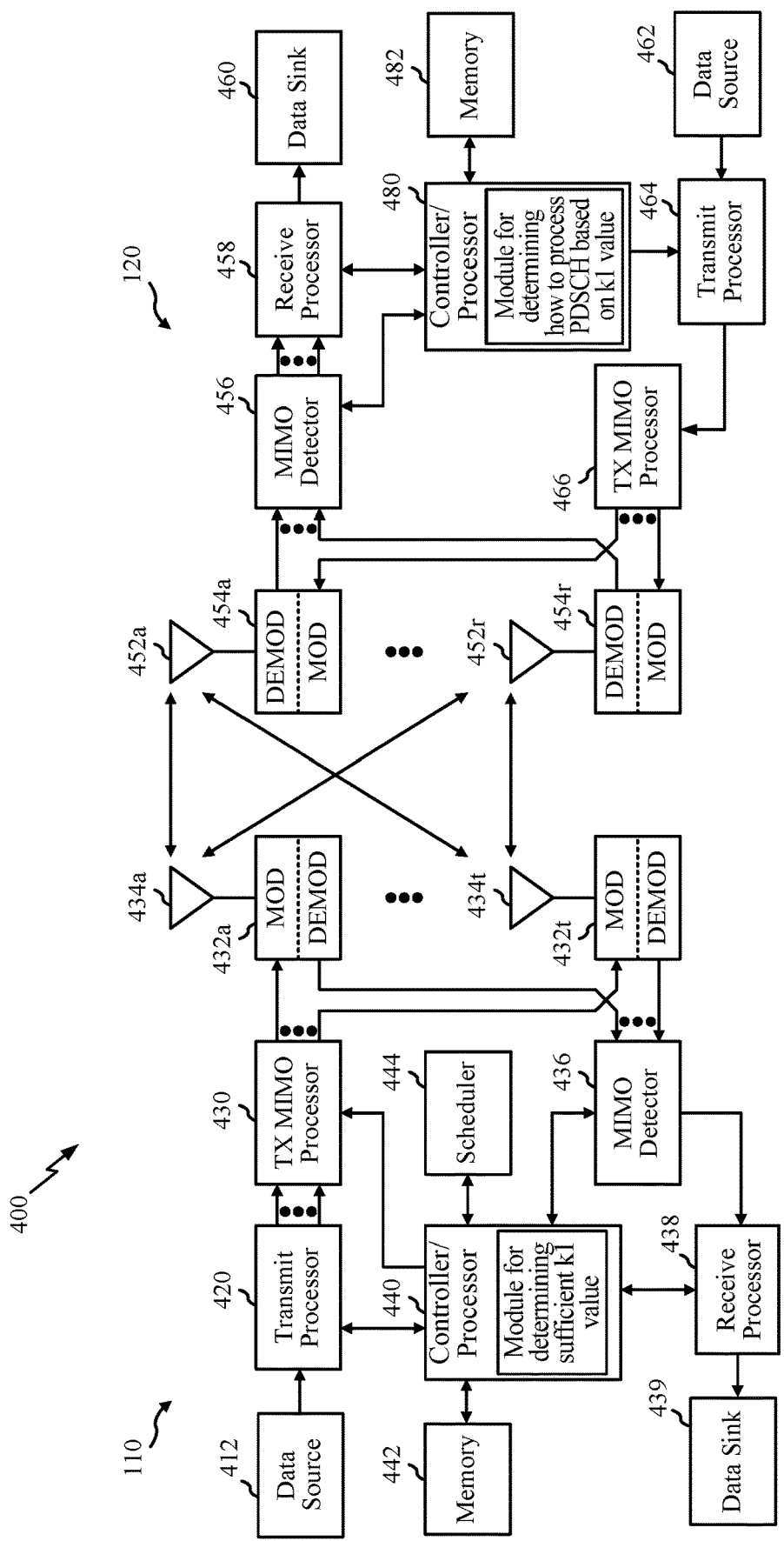
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein. For example, as shown in FIG. 4, the processor 440 has a module for determining a sufficient k1 value, according to aspects described herein. As another example, as shown in FIG. 4, the processor 480 has a module for determining how to process PDSCH based on a k1 value, according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
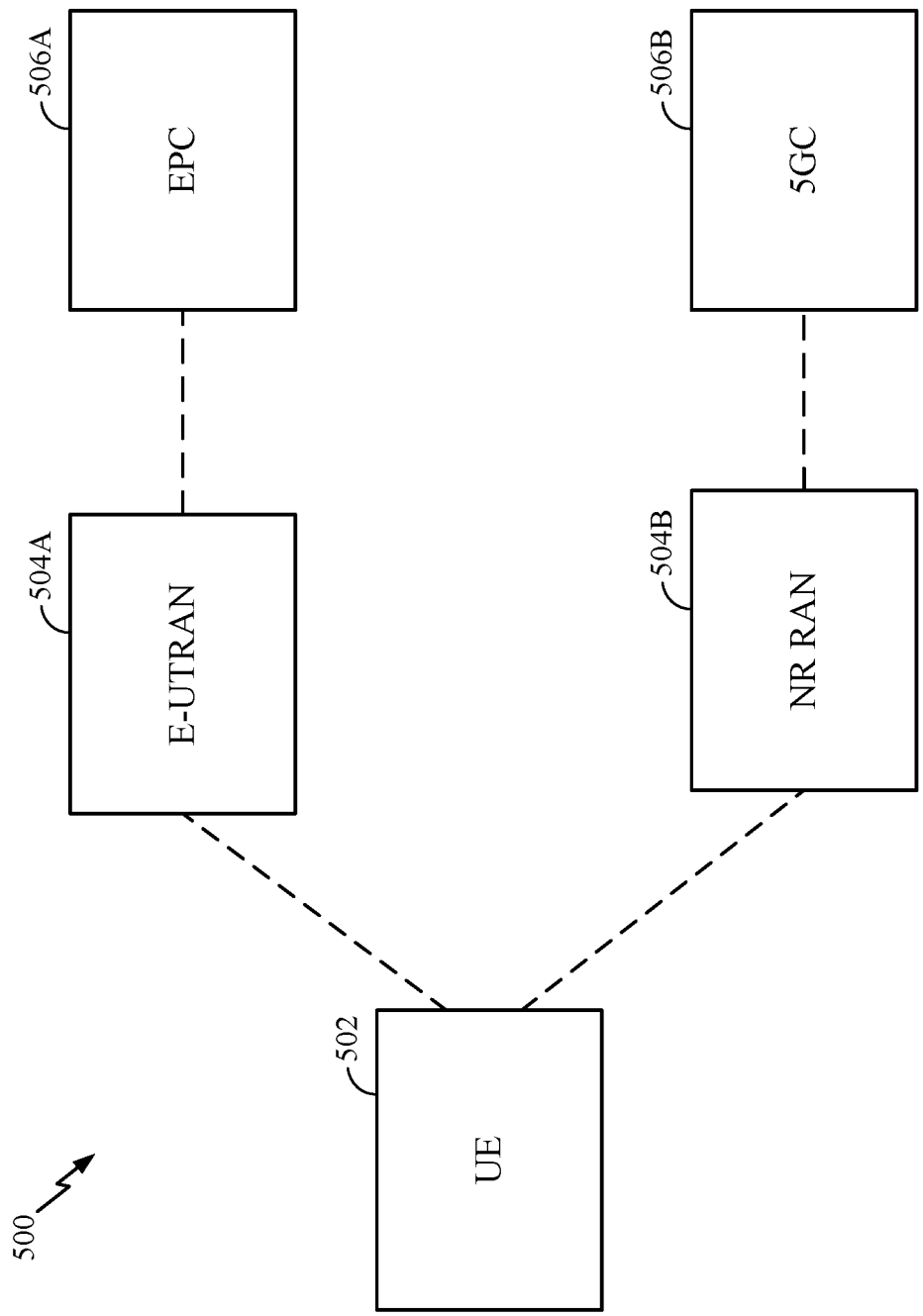
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
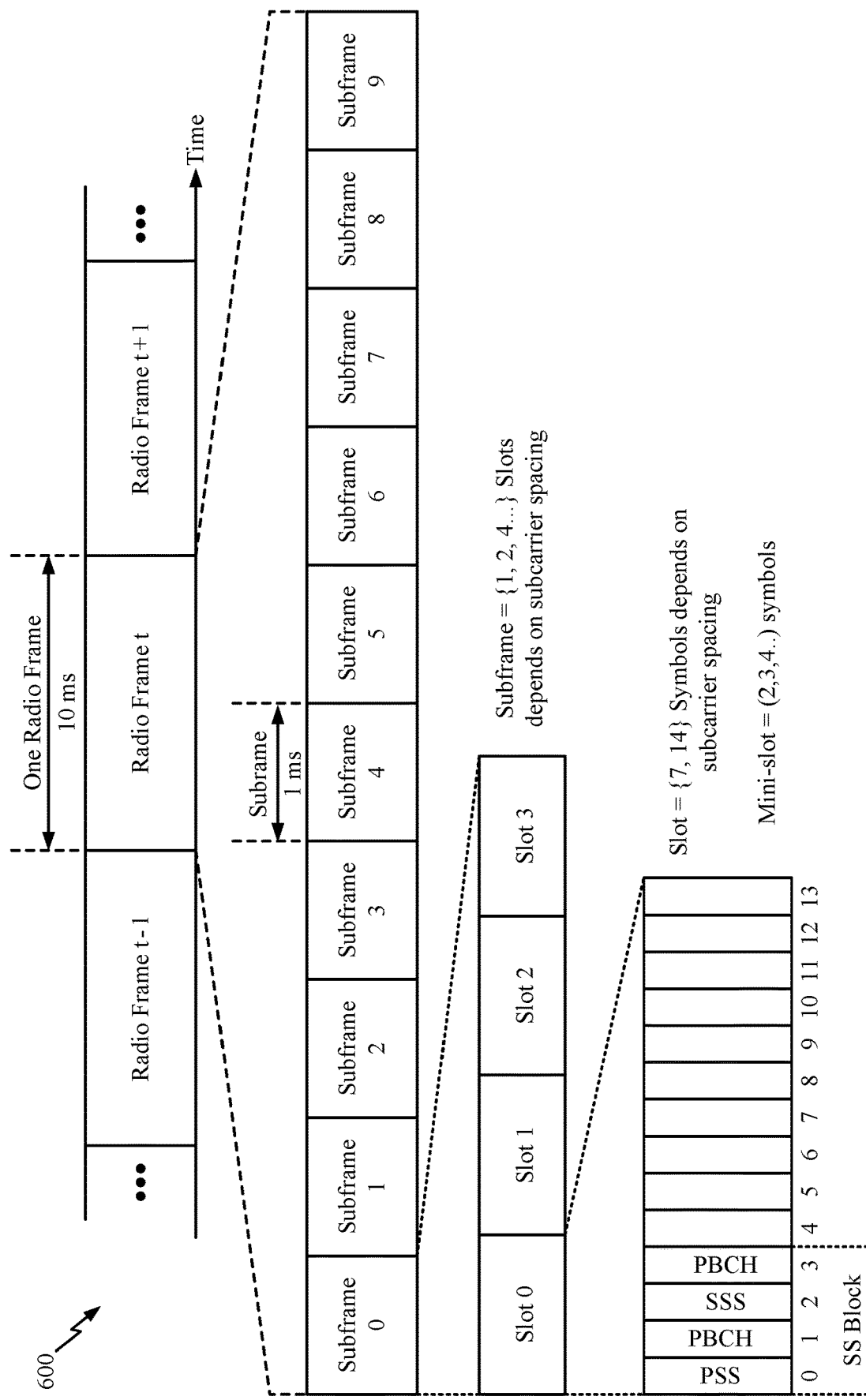
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example PDSCH Processing In Presence of DLPI

Figure 7:
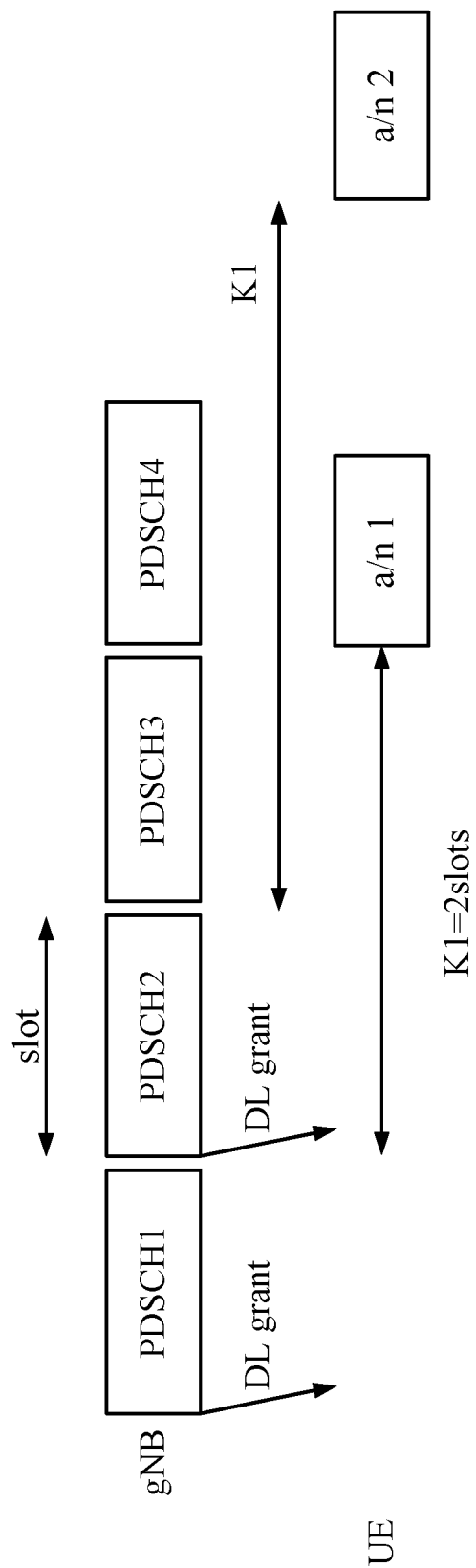
FIG. 7 is an example transmission and processing timeline for physical downlink shared channel (PDSCH), in accordance with certain aspects of the present disclosure.

In certain wireless communication systems, a base station (BS) schedules transmissions to a user equipment (UE) by sending the UE a downlink grant. In some examples, as shown in FIG. 7, a next generation Node B (gNB) sends a downlink grant to a UE scheduling the UE for a physical downlink shared channel (PDSCH) transmission (e.g., PDSCH 1 in FIG. 7). The BS may send the downlink grant in downlink control information (DCI) for each scheduled PDSCH. In some examples, the DCI is a fallback DCI (e.g., DCI format 1_0) or a regular DCI (e.g., DCI format 1_1). The BS sends a feedback timing indicator in the DCI. For example, the BS sends a 3-bit PDSCH-to-HARQ (hybrid automatic repeat request (HARQ) feedback timing indicator, referred to as the k1 value. The k1 value may indicate a slot for the UE to provide HARQ acknowledgment (ACK) or negative ACK (NACK) information for the PDSCH transmission. Thus, the k1 defines the processing time for the UE to decode the PDSCH transmission and prepare the ACK/NACK transmission. In some examples, the k1 value indicates a number of slots from the end of the PDSCH transmission to the time at which the UE sends the ACK/NACK to the BS. The k1 values may take values of {1, 2, 3 . . . 8}. As shown in FIG. 7, the gNB sends a k1 value of two slots for PDSCH 1 and the UE sends the ACK/NACK feedback for the PDSCH 1 two slots after the end of the PDSCH 1 transmission.

Figure 8:
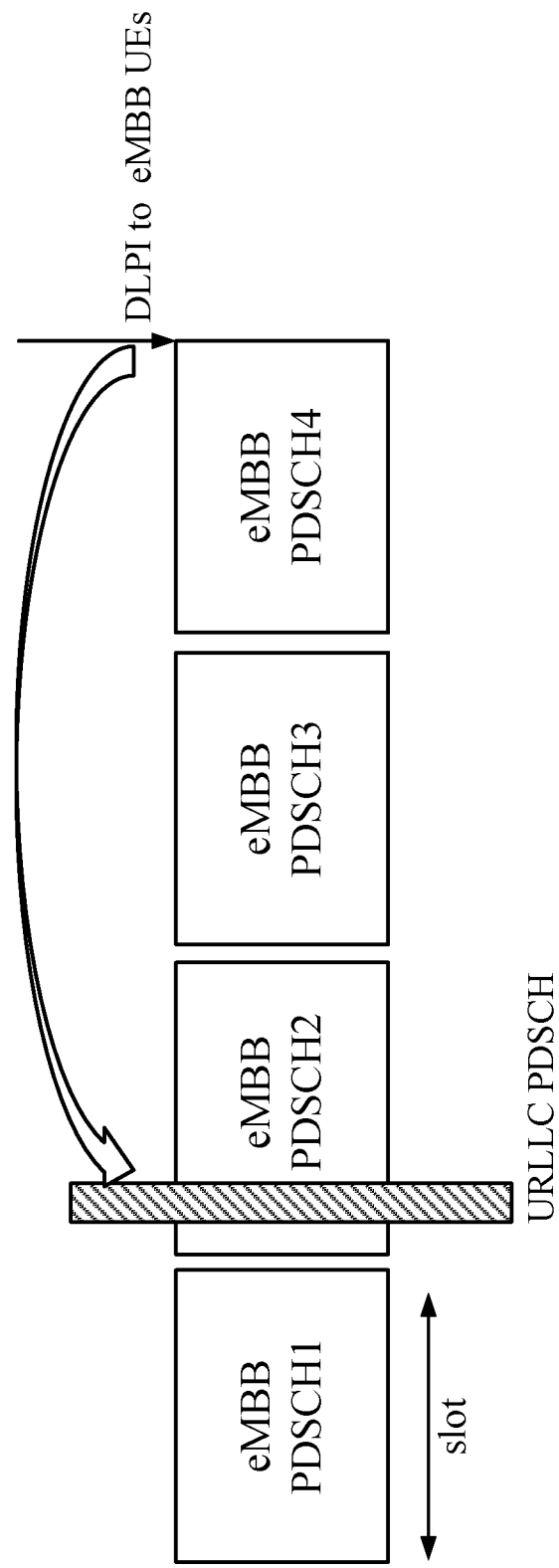
FIG. 8 is an example transmission timeline showing transmission of downlink preemption indication (DLPI) for enhanced mobile broadband (eMBB) PDSCH transmissions preempted by a ultra-reliable low-latency communication (URLLC) PDSCH, in accordance with certain aspects of the present disclosure.

In certain systems, such as NR (new radio or 5G) systems, a scheduled PDSCH transmission may be preempted by another PDSCH transmission. For example, NR supports a variety of services including enhanced mobile broadband (eMBB) service and ultra-reliable low-latency communications (URLLC) service. An eMBB PDSCH transmission may be preempted by a URLLC PDSCH transmission. The BS may send a downlink preemption indication (DLPI) to indicate the preempted resources. For example, as shown in FIG. 8, when both URLLC and eMBB traffic are present, the gNB sends a DLPI to eMBB UEs (the preempted UE), indicating the time/frequency PDSCH resources that are preempted by URLLC transmissions. The DLPI may be sent at a periodicity of every n slots. The DLPI may indicate the preempted resources in the last n slots. In some examples, the periodicity may take values of n=1, 2, or 4.

Figure 9:
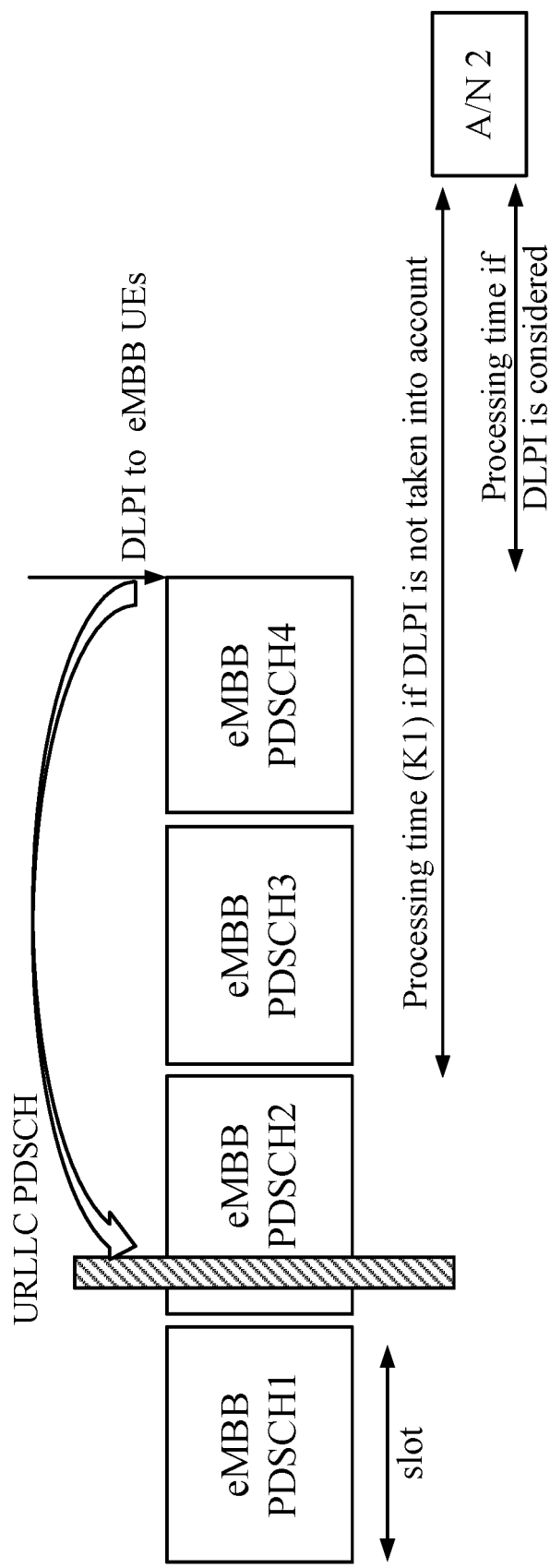
FIG. 9 is an example transmission and processing timeline showing transmission of DLPI for eMBB PDSCH transmissions preempted by URLLC PDSCH.

The eMBB UE can improve decoding performance by taking the DLPI (e.g., the indicated preempted resources) into account. However, as shown in FIG. 9, if the eMBB UE starts the PDSCH decoding after DLPI is received (e.g., in order to take the DLPI into account in the decoding), there may be insufficient time to finish the UE-side processing (e.g., the PDSCH decoding and ACK/NACK preparation) before the k1 timing signaled by gNB, i.e., before the slot in which the UE needs to send the ACK/NACK information. Therefore, techniques for PDSCH transmission processing in the presence of the DLPI are desirable.

Accordingly, aspects of the present disclosure provide apparatus, methods, processing systems, and computer readable mediums for PDSCH processing in presence of DLPI.

In some examples, the BS may ensure that a sufficiently large k1 value is signaled from the gNB to UE to ensure that the DLPI can be incorporated into PDSCH decoding with time to send the HARQ feedback for the PDSCH transmission within the k1 timing.

Figure 10:
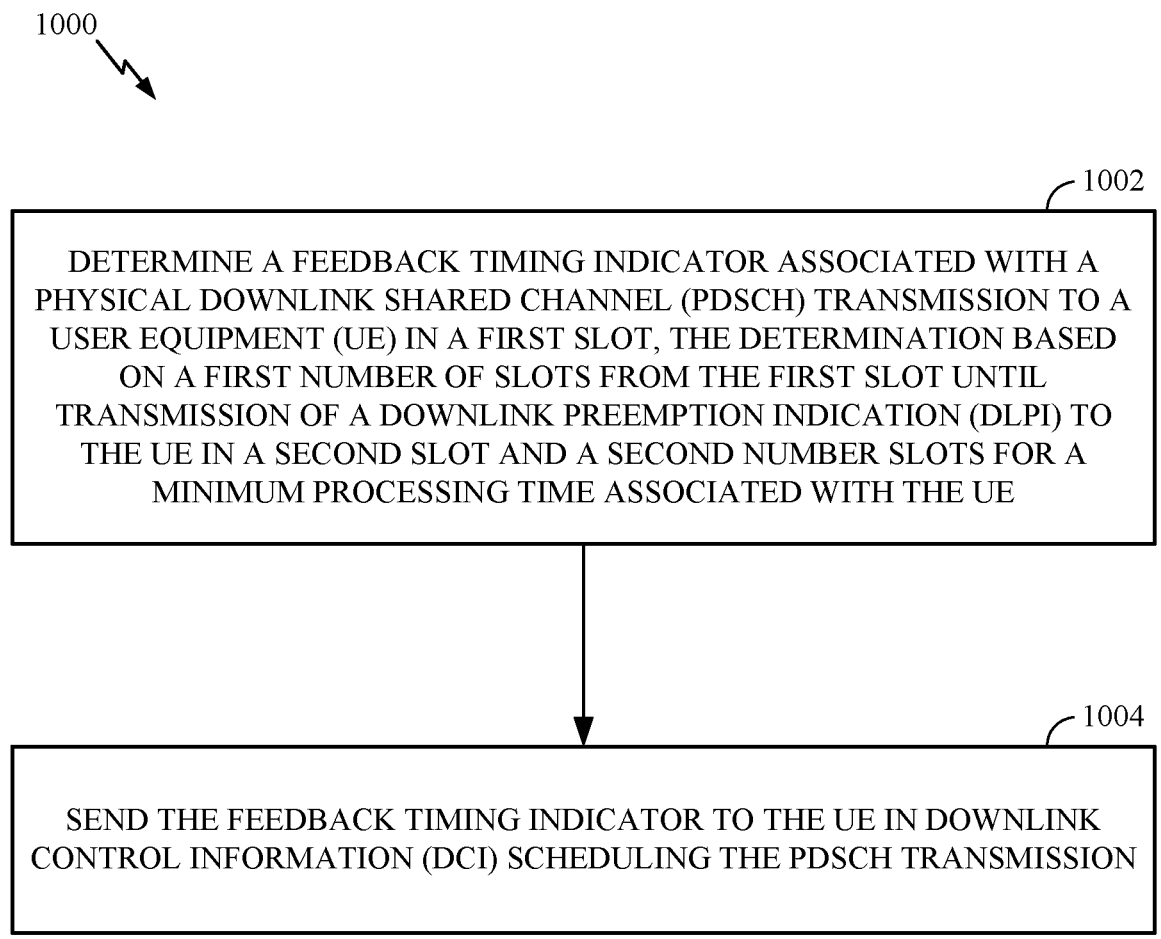
FIG. 10 is a flow diagram showing example operations for wireless communications by a BS, in accordance with certain aspects of the present disclosure.

FIG. 10 is a flow diagram showing example operations 1000 for wireless communications, in accordance with certain aspects of the present disclosure. The operations 1000 may be performed by a BS, such as a BS 110 in the wireless communication network 100. Operations 1000 may be implemented as software components that are executed and run on one or more processors (e.g., processor 440 of FIG. 4). Further, the transmission and reception of signals by the BS in operations 1000 may be enabled, for example, by one or more antennas (e.g., antennas 434 of FIG. 4). In certain aspects, the transmission and/or reception of signals by the BS may be implemented via a bus interface of one or more processors (e.g., processor 440) obtaining and/or outputting signals.

The operations 1000 begin, at 1002, by determining a feedback timing indicator (e.g., the k1 value) associated with a PDSCH transmission (e.g., an eMBB PDSCH) to a UE in a first slot. In some examples, the determination is based on a first number of slots from the first slot until transmission of a DLPI to the UE in a second slot and a second number slots for a minimum processing time associated with the UE. The minimum processing time associated with the UE may be the number of slots for the UE to decode the scheduled PDSCH transmission and prepare the HARQ feedback for the scheduled PDSCH transmission. The BS determines the second slot in which the DLPI is transmitted based on the periodicity n associated with the DLPI.

Figure 11:
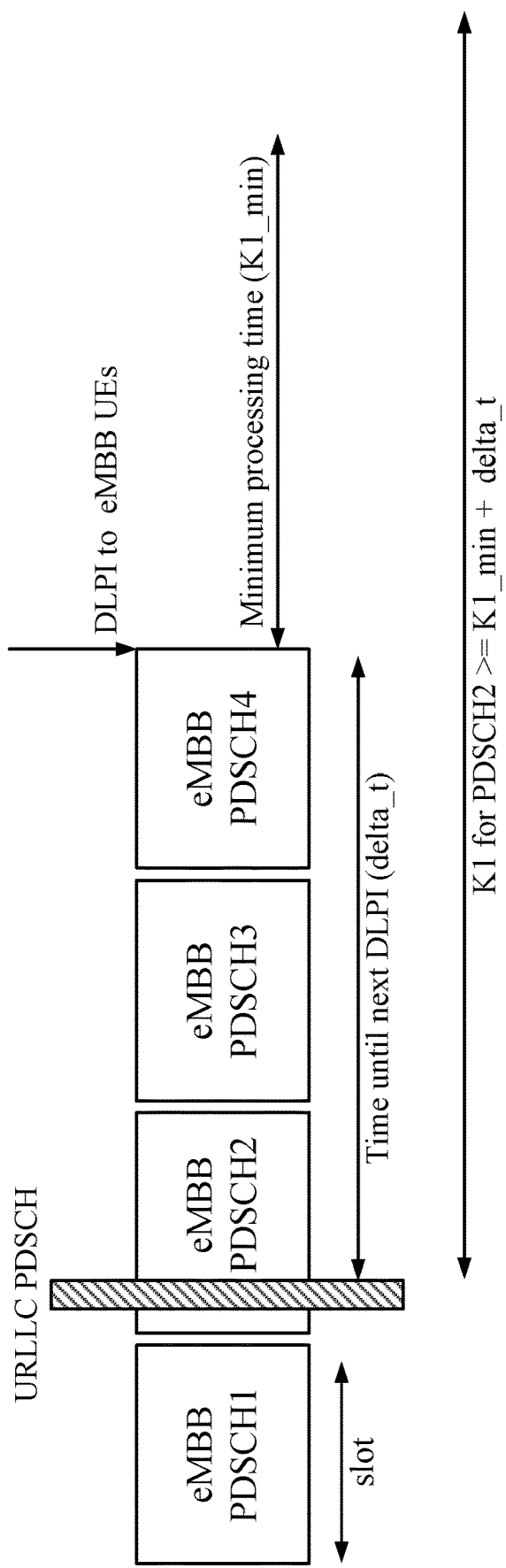
FIG. 11 is an example transmission and processing timeline showing transmission of DLPI for eMBB PDSCH transmissions preempted by URLLC PDSCH, in accordance with certain aspects of the present disclosure.

In some examples, the BS selects a feedback timing indicator that is equal to or greater than a sum of the first number of slots and the second number of slots. As shown in FIG. 11, in the example of n=4 DLPI periodicity, the gNB schedules eMBB PDSCH 2 in the second of the 4 slots and preempts with a URLLC PDSCH in that slot. The first number of slots, the number of slots from the end of the PDSCH transmission (e.g., the end PDSCH 2 in the example in FIG. 11) to the DLPI (2 slots in FIG. 11) may be referred to as the delta_t. The second number of slots for the minimum processing time for the UE to process the PDSCH transmission (e.g., PDSCH 2 in the example shown in FIG. 11) may be referred to as the k1_min. The minimum processing time may be a UE-specific amount that is based on UE capability. In order to ensure that the UE can process the PDSCH transmission and also take into account the DLPI, the gNB may send a timing feedback indicator value 11 that is equal to or greater than the sum delta_t+k1_min, as shown in FIG. 11.

At 1004, the BS sends DCI to the UE scheduling the PDSCH transmission to the UE in the first slot. The DCI includes the feedback timing indicator (e.g., the k1 value). The feedback timing indicator indicates a number of slots after the scheduled PDSCH transmission for the UE to send HARQ feedback (e.g., ACK/NACK) for the scheduled PDSCH transmission.

The BS may then send the scheduled PDSCH (e.g., the eMBB PDSCH) in the slot and the other PDSCH (to the UE or another UE) on the preempted resources in the slot of the scheduled PDSCH. The BS may send the DLPI, indicating the preempted resources by the other PDSCH (e.g., by a URLLC PDSCH). The BS may receive ACK/NACK feedback from the UE for the PDSCH based on the feedback timing indicator.

In some examples, when the DLPI is received in the same slot as the preempted resources (e.g., for n=1 DLPI periodicity), then the UE can take the DLPI into account during the decoding of the PDSCH transmission. When n>1, then the UE may or may not take the DLPI into account. When the UE receives a feedback timing indicator that is sufficiently large (e.g., k1≥delta_t+k1_min), then the UE may take the DLPI into account for the decoding. For example, the UE buffers the PDSCH transmission and waits until the DLPI is received to process the PDSCH transmission. In some examples, when the k1 is not sufficiently large (e.g., k1≤delta_t+k1_min), the UE may declare an error case. In some examples, when the k1 is not sufficiently large, the UE can proceed with regular decoding and is not expected to take DLPI into account.

Figure 12:
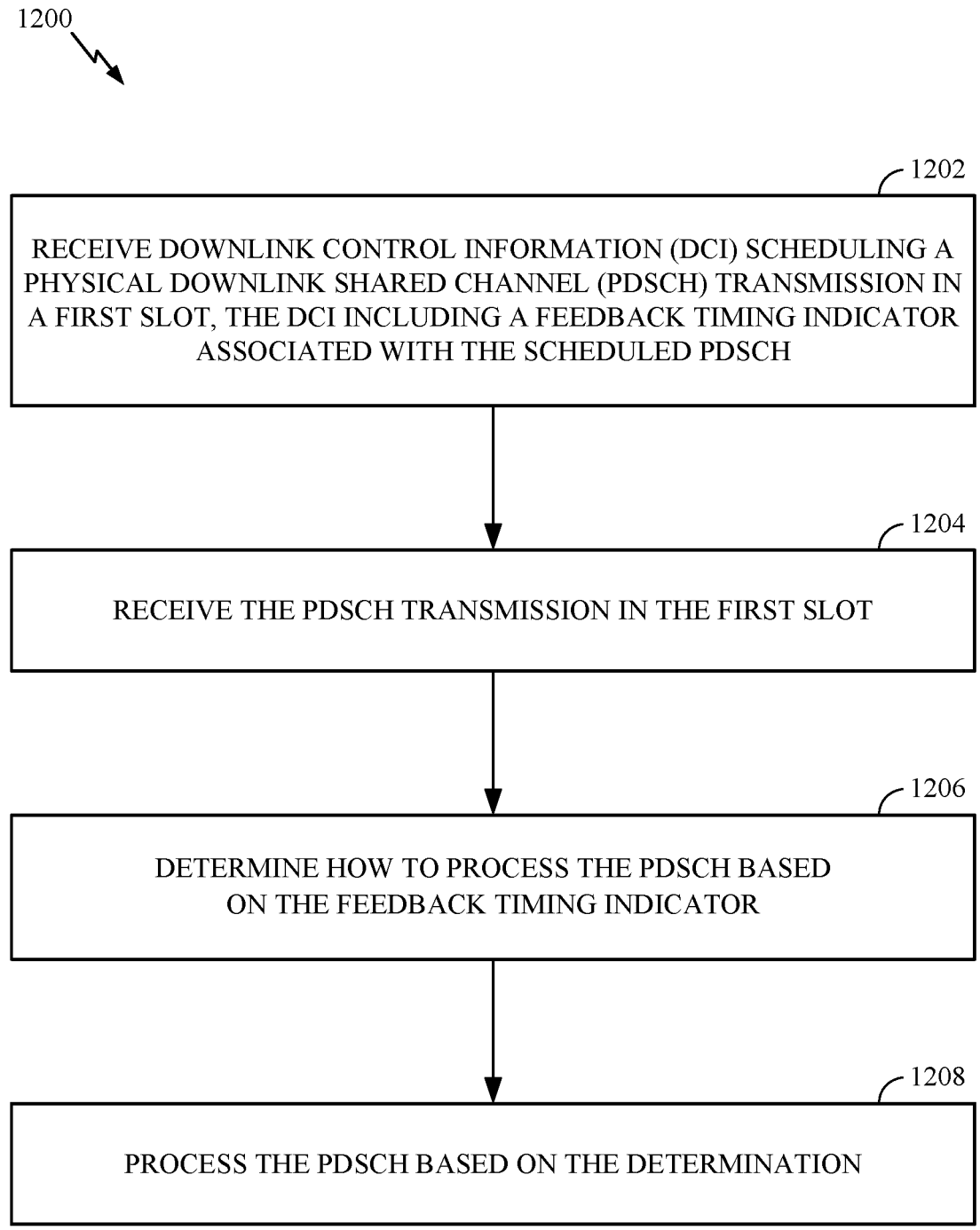
FIG. 12 is a flow diagram showing example operations for wireless communications by a UE, in accordance with certain aspects of the present disclosure.

FIG. 12 is a flow diagram showing example operations 1200 for wireless communications, in accordance with certain aspects of the present disclosure. Operations 1200 may be performed, for example, by a UE such as a UE 120 in the wireless communications network 100. The operations 1200 may be complimentary operations by the UE to the operations 1000 performed by the BS. Operations 1200 may be implemented as software components that are executed and run on one or more processors (e.g., processor 480 of FIG. 4). Further, the transmission and reception of signals by the UE in operations 1200 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 1200 may begin, at 1202, by receiving DCI scheduling a PDSCH transmission (e.g., an eMBB PDSCH) in a first slot. The DCI includes a feedback timing indicator (e.g., a k1 value) associated with the scheduled PDSCH transmission. At 1204, the UE receives the PDSCH transmission in the first slot. At 1206, the UE determines how to process the PDSCH transmission based on the feedback timing indicator. At 1208, the UE processes the PDSCH transmission based on the determination.

For example, the UE determines whether to begin processing the PDSCH transmission immediately after the PDSCH transmission is received—without waiting for, and without taking into account DLPI, determine buffer the PDSCH transmission and wait for and take into account DLPI to begin processing the PDSCH transmission and account for preempted resources in the decoding, or may declare an error case. The UE may determine how to process the PDSCH based on a first number of slots from the first slot until a second slot in which DLPI is transmitted (e.g., the delta_t) and a second number slots for a minimum processing time associated with the UE (e.g., the k1_min).

Figure 13:
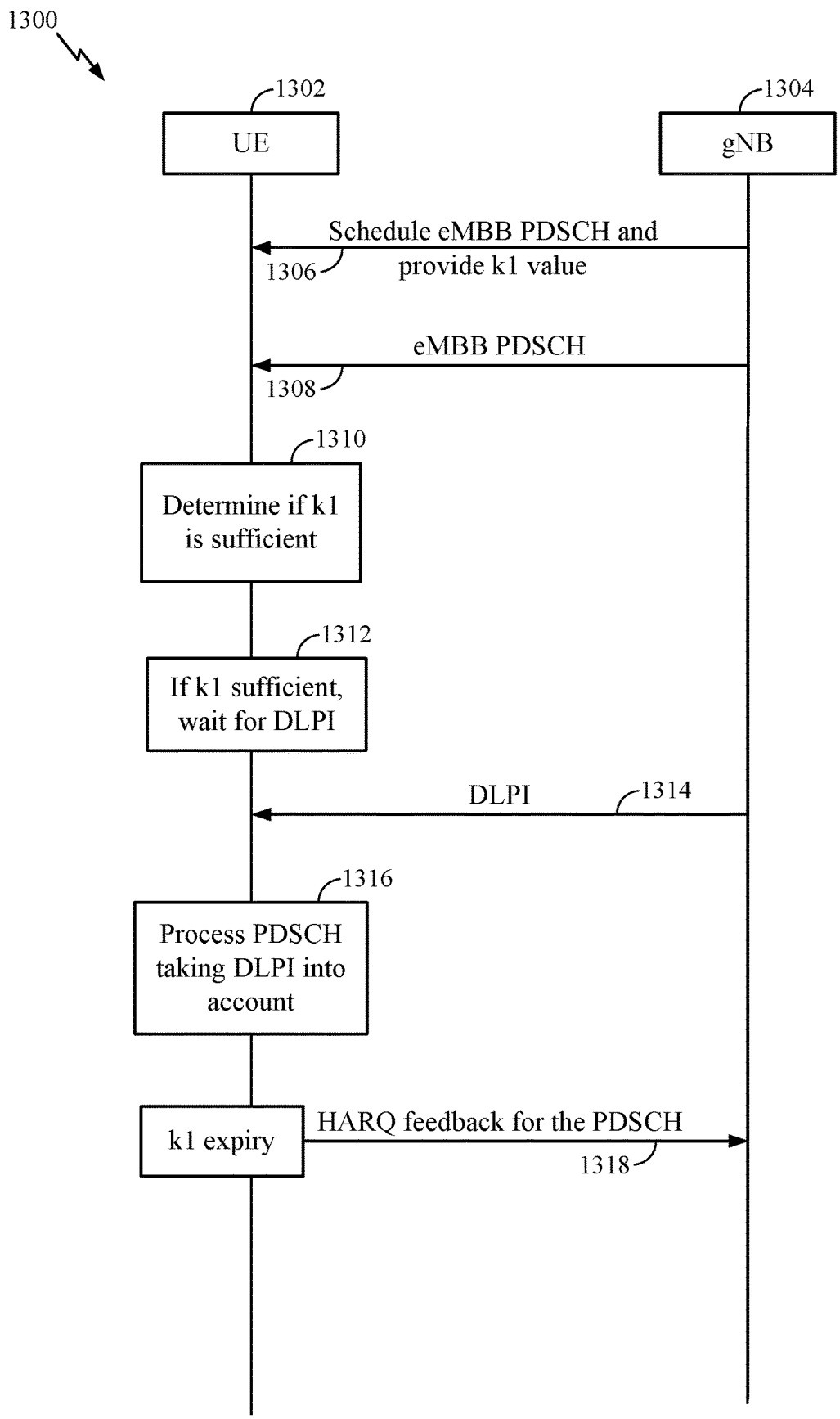
FIG. 13 is an example call flow showing PDSCH processing taking DLPI into account for a sufficient timing feedback indicator value, in accordance with certain aspects of the present disclosure.
Figure 14:
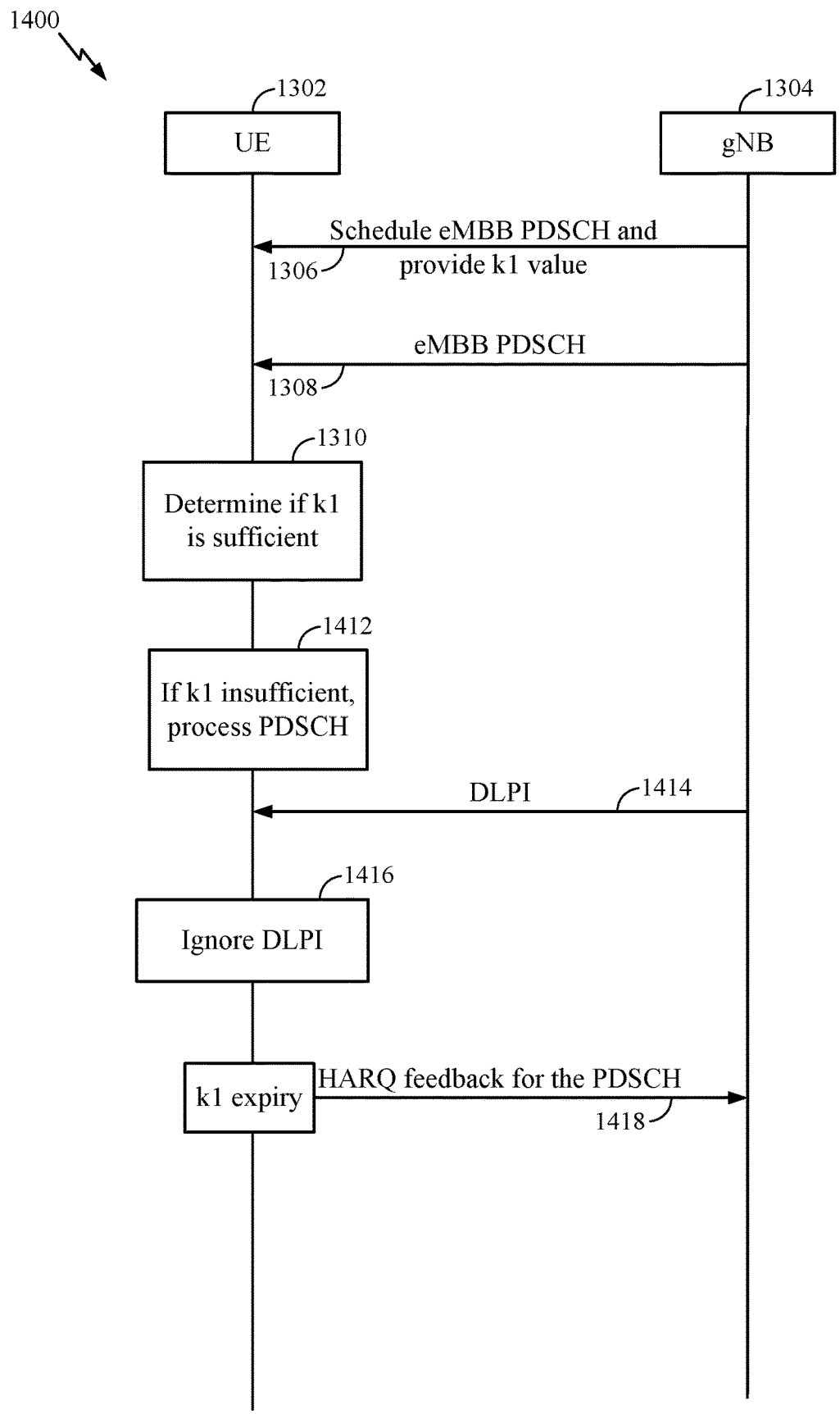
FIG. 14 is an example call flow showing PDSCH processing without taking DLPI into account for an insufficient timing feedback indicator value, in accordance with certain aspects of the present disclosure.
Figure 15:
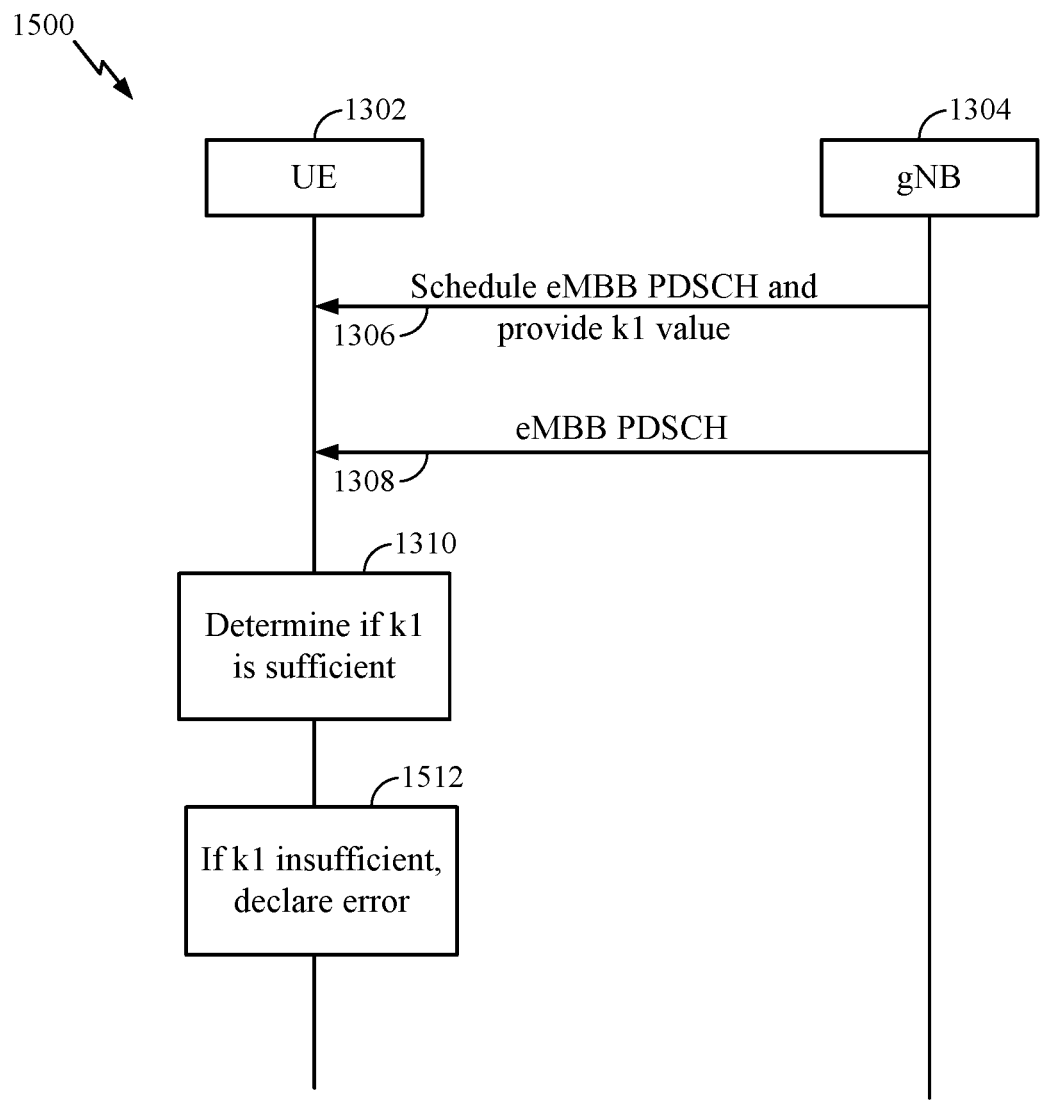
FIG. 15 is an example call flow showing error declaration for an insufficient timing feedback indicator value, in accordance with certain aspects of the present disclosure.

As shown in the example call flows 1300, 1400, and 1500 in FIGS. 13-15, respectively, the BS 1304 schedules the UE 1302 for an eMBB PDSCH, at 1306, and provides the k1 value for the eMBB PDSCH transmission. At 1308, the BS 1304 sends the scheduled eMBB PDSCH transmission to the UE 1302. At 1310, the UE 1302 determines if the k1 value is sufficient (e.g., equal to or larger than the sum of delta_t+ 1_min). As shown in FIG. 13, when the k1 value is sufficient the UE 1302 waits for the DLPI (e.g., buffers the PDSCH transmission) at 1312. At 1314, the UE 1302 receives the DLPI from the BS 1304 and then, at 1316, the UE 1302 processes the PDSCH transmission taking the DLPI into account. At 1318, based on the k1 timing, the UE sends the HARQ feedback for the PDSCH transmission. As shown in FIG. 14, when the k1 value is insufficient (e.g., smaller than the sum of delta_t+k1_min) at 1412, the UE processes the PDSCH transmission without waiting for the DLPI. After receiving the DLPI at 1414, the UE ignores the DPLI at 1416 and, at 1418, the UE sends the HARQ feedback for the PDSCH transmission based on the k1 timing). Alternatively, as shown in FIG. 15, when the k1 value is insufficient, the UE declares an error case at 1512.

Figure 16:
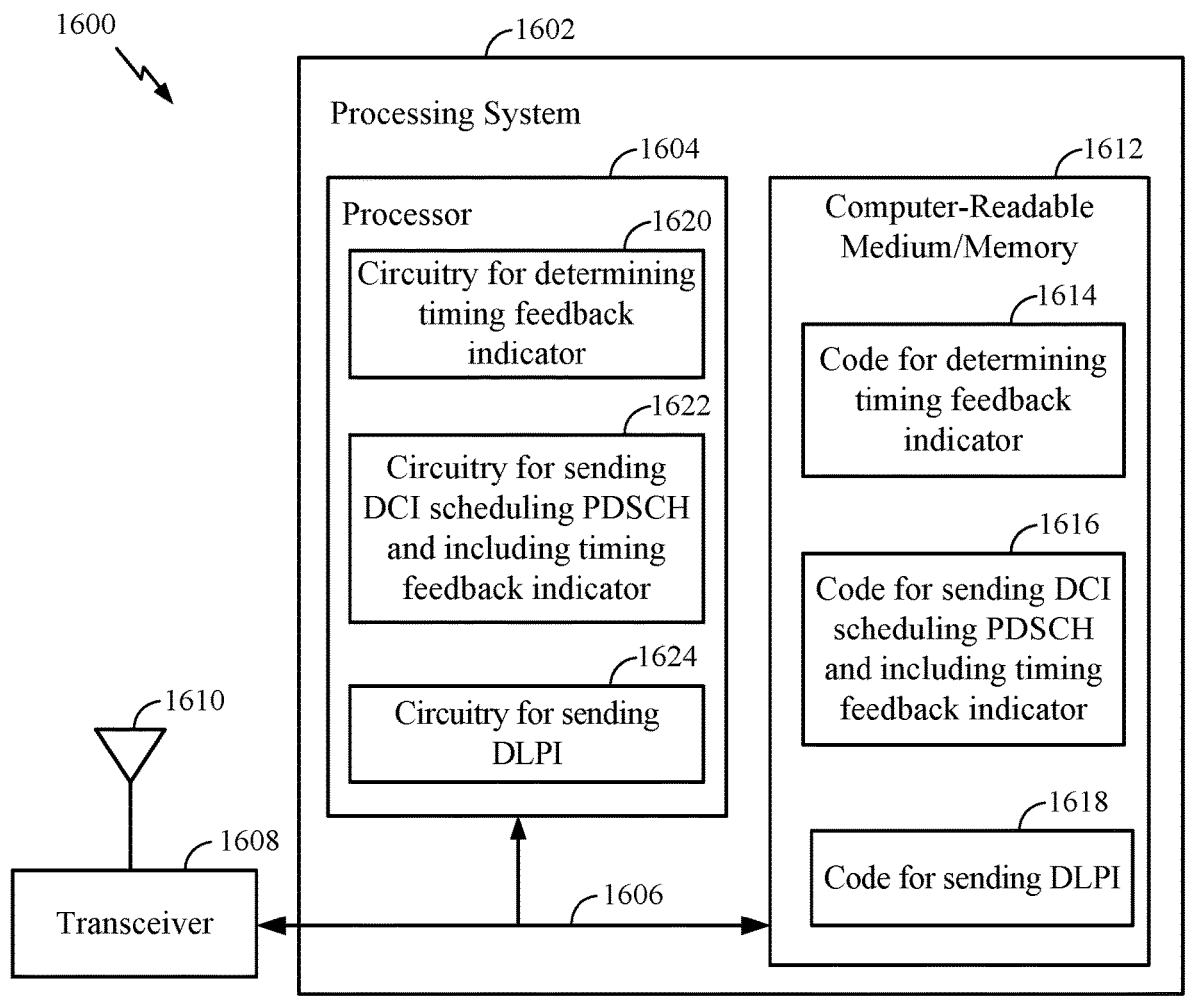
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 10. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/ memory 1612 is configured to store instructions (e.g., computer executable code) that when executed by the processor 1604, cause the processor 1604 to perform the operations illustrated in FIG. 10, or other operations for performing the various techniques discussed herein for PDSCH processing in presence of DLPI. In certain aspects, computer-readable medium/memory 1612 stores code 1614 for determining a feedback timing indicator, code 1616 for sending DCI scheduling a PDSCH transmission including the feedback timing indicator, and code 1618 for sending DLPI. In certain aspects, the processor 1004 has circuitry configured to implement the code stored in the computer-readable medium/memory 1012. The processor 1004 includes circuitry 1620 for determining a feedback timing indicator, circuitry 1622 for sending DCI scheduling a PDSCH transmission including the feedback timing indicator, and circuitry 1624 for sending DLPI.

Figure 17:
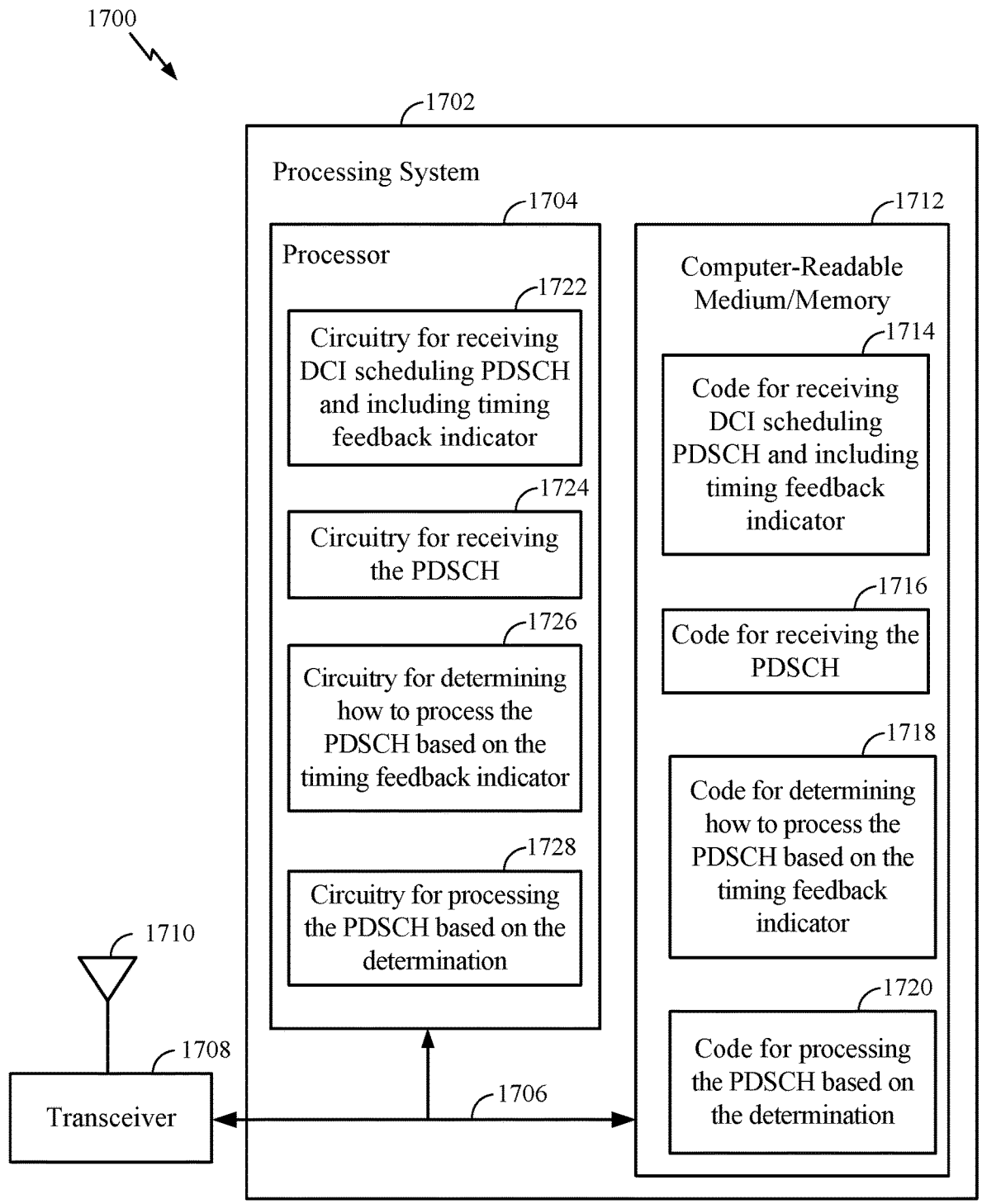
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 12. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/ memory 1712 is configured to store instructions (e.g., computer executable code) that when executed by the processor 1704, cause the processor 1704 to perform the operations illustrated in FIG. 12, or other operations for performing the various techniques discussed herein for PDSCH processing in presence of DLPI. In certain aspects, computer-readable medium/memory 1712 stores code 1714 for receiving DCI scheduling a PUSCH transmission including the feedback timing indicator, code 1716 for receiving the PDSCH transmission; code 1718 for determining how to process the PDSCH transmission based on the feedback timing indicator; and code 1720 for processing the PDSCH transmission based on the determination. In certain aspects, the processor 1704 has circuitry configured to implement the code stored in the computer-readable medium/memory 1712. The processor 1704 includes circuitry 1722 for receiving DCI scheduling a PUSCH transmission including the feedback timing indicator, circuitry 1724 for receiving the PDSCH transmission; circuitry 1726 for determining how to process the PDSCH transmission based on the feedback timing indicator; and circuitry 1728 for processing the PDSCH transmission based on the determination.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10 and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    receiving, in a first slot, downlink control information (DCI) scheduling a physical downlink shared channel (PDSCH) transmission in a second slot, the DCI including a feedback timing indicator indicating a first number of slots between the PDSCH transmission until a third slot for the UE to send feedback for the PDSCH;
    receiving the PDSCH transmission in the second slot;
    determining how to process the PDSCH transmission based on whether the first number of slots indicated by the feedback timing indicator is equal to or larger than a sum of a second number of slots between the PDSCH transmission in the second slot and a fourth slot in which a downlink preemption indication (DLPI) is received by the UE and a third number of slots for a minimum processing time of a PDSCH, wherein determining how to process the PDSCH transmission comprises processing the PDSCH transmission with accounting for the DLPI when the first number of slots indicated by the feedback timing indicator is equal to or larger than the sum of the second number of slots and the third number of slots; and
    processing the PDSCH transmission based on the determination.

2. The method of claim 1, wherein determining how to process the PDSCH transmission comprises processing the PDSCH transmission, after receiving the PDSCH transmission in the second slot, without accounting for the DLPI when the first number of slots indicated by the feedback timing indicator is smaller than the sum of the second number of slots and the third number of slots.

3. The method of claim 1, wherein determining how to process the PDSCH transmission comprises declaring an error case when the first number of slots indicated by the feedback timing indicator is smaller than the sum of the second number of slots and the third number of slots.

4. The method of claim 1, wherein the minimum processing time associated with the UE comprises an amount of time for the UE to decode the PDSCH transmission and prepare hybrid automatic repeat request (HARQ) feedback for the PDSCH transmission.

5. The method of claim 1, further comprising determining the fourth slot in which the DLPI is transmitted based on a periodicity associated with the DLPI.

6. The method of claim 1, wherein the DLPI indicates PDSCH resources in at least one of: the second slot or the first number of slots that are preempted by another PDSCH transmission.

7. The method of claim 6, wherein:
    the PDSCH transmission comprises an enhanced mobile broadband (eMBB) PDSCH transmission; and
    the another PDSCH transmission comprises an ultra-reliable low-latency communication (URLLC) PDSCH transmission.

8. An apparatus for wireless communications, comprising:
    at least one processor configured to:
        receive, in a first slot, downlink control information (DCI) scheduling a physical downlink shared channel (PDSCH) transmission in a second slot, the DCI including a feedback tinning indicator indicating a first number of slots between the PDSCH transmission until a third slot for a user equipment (UE) to send feedback for the PDSCH;
        receive the PDSCH transmission in the second slot;
        determine how to process the PDSCH transmission based on whether the first number of slots indicated by the feedback timing indicator is equal to or larger than a sum of a second number of slots between the PDSCH transmission in the second slot and a fourth slot in which a downlink preemption indication (DLPI) is received by the UE and a third number of slots for a minimum processing time of a PDSCH, wherein determining how to process the PDSCH transmission comprises processing the PDSCH transmission with accounting for the DLPI when the first number of slots indicated by the feedback timing indicator is equal to or larger than the sum of the second number of slots and the third number of slots; and
        process the PDSCH transmission based on the determination; and a memory coupled with the at least one processor.

9. The apparatus of claim 8, wherein the at least one processor is configured to determine how to process the PDSCH transmission including processing the PDSCH transmission, after receiving the PDSCH transmission in the second slot, without accounting for the DLPI when the first number of slots indicated by the feedback timing indicator is smaller than the sum of the second number of slots and the third number of slots.

10. The apparatus of claim 8, wherein the at least one processor is configured to determine how to process the PDSCH transmission including declaring an error case when the first number of slots indicated by the feedback timing indicator is smaller than the sum of the second number of slots and the third number of slots.

11. The apparatus of claim 8, wherein the minimum processing time associated with the apparatus comprises an amount of time for the apparatus to decode the PDSCH transmission and prepare hybrid automatic repeat request (HARQ) feedback for the PDSCH transmission.

12. The apparatus of claim 8, wherein the at least one processor is configured to determine the fourth slot in which the DLPI is transmitted based on a periodicity associated with the DLPI.

13. The apparatus of claim 8, wherein the DLPI indicates PDSCH resources in at least one of: the second slot or the first number of slots that are preempted by another PDSCH transmission.

14. The apparatus of claim 13, wherein:
the PDSCH transmission comprises an enhanced mobile broadband (eMBB) PDSCH transmission; and
the another PDSCH transmission comprises an ultra-reliable low-latency communication (URLLC) PDSCH transmission.

15. An apparatus for wireless communications, comprising:
means for receiving, in a first slot, downlink control information (DCI) scheduling a physical downlink shared channel (PDSCH) transmission in a second slot, the DCI including a feedback timing indicator indicating a first number of slots between the PDSCH transmission until a third slot for a user equipment (UE) to send feedback for the PDSCH;
means for receiving the PDSCH transmission in the second slot;
means for determining how to process the PDSCH transmission based on whether the first number of slots indicated by the feedback timing indicator is equal to or larger than a sum of a second number of slots between the PDSCH transmission in the second slot and a fourth slot in which a downlink preemption indication (DLPI) is received by the UE and a third number of slots for a minimum processing time of a PDSCH, wherein determining how to process the PDSCH transmission comprises processing the PDSCH transmission with accounting for the DLPI when the first number of slots indicated by the feedback timing indicator is equal to or larger than the sum of the second number of slots and the third number of slots; and
means for processing the PDSCH transmission based on the determination.

16. The apparatus of claim 15, wherein means for determining how to process the PDSCH transmission comprises means for processing the PDSCH transmission, after receiving the PDSCH transmission in the second slot, without accounting for the DLPI when the first number of slots indicated by the feedback timing indicator is smaller than the sum of the second number of slots and the third number of slots.

17. The apparatus of claim 15, wherein means for determining how to process the PDSCH transmission comprises means for declaring an error case when the first number of slots indicated by the feedback timing indicator is smaller than the sum of the second number of slots and the third number of slots.

18. A non-transitory computer readable medium having computer executable code stored thereon for wireless communications, comprising:
code for receiving, in a first slot, downlink control information (DCI) scheduling a physical downlink shared channel (PDSCH) transmission in a second slot, the DCI including a feedback timing indicator indicating a first number of slots between the PDSCH transmission until a third slot for a user equipment (UE) to send feedback for the PDSCH;
code for receiving the PDSCH transmission in the second slot;
code for determining how to process the PDSCH transmission based on whether the first number of slots indicated by the feedback timing indicator is equal to or larger than a sum of a second number of slots between the PDSCH transmission in the second slot and a fourth slot in which a downlink preemption indication (DLPI) is received by the UE and a third number of slots for a minimum processing time of a PDSCH, wherein determining how to process the PDSCH transmission comprises processing the PDSCH transmission with accounting for the DLPI when the first number of slots indicated by the feedback timing indicator is equal to or larger than the sum of the second number of slots and the third number of slots; and
code for processing the PDSCH transmission based on the determination.

19. The non-transitory computer readable medium of claim 18, wherein code for determining how to process the PDSCH transmission comprises code for processing the PDSCH transmission, after receiving the PDSCH transmission in the second slot, without accounting for the DLPI when the first number of slots indicated by the feedback timing indicator is smaller than the sum of the second number of slots and the third number of slots.

20. The non-transitory computer readable medium of claim 18, wherein code for determining how to process the PDSCH transmission comprises code for declaring an error case when the first number of slots indicated by the feedback timing indicator is smaller than the sum of the second number of slots and the third number of slots.

* * * * *